P. A. McCASKEY.
FILING APPLIANCE.
APPLICATION FILED OCT. 3, 1907.

977,960.

Patented Dec. 6, 1910.
3 SHEETS—SHEET 1.

WITNESSES:
J. H. Gardner.
M. D. Beaty.

INVENTOR:
Perry A. McCaskey,
BY E. T. Silvius,
ATTORNEY.

P. A. McCASKEY.
FILING APPLIANCE.
APPLICATION FILED OCT. 3, 1907.
977,960.
Patented Dec. 6, 1910.
3 SHEETS—SHEET 2.
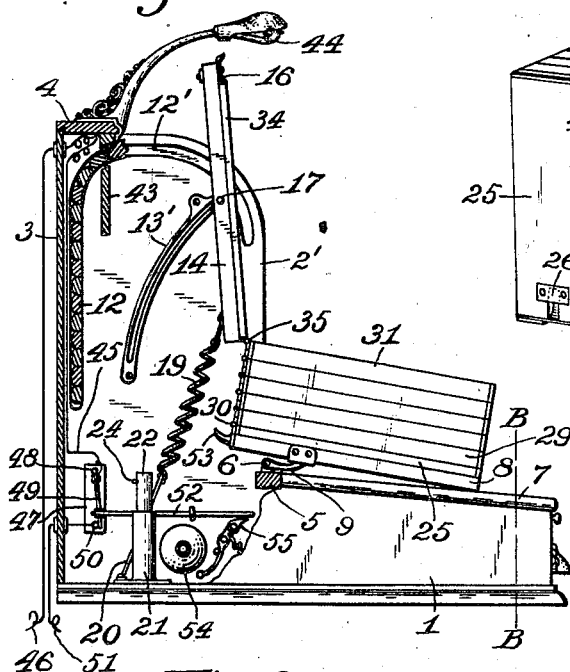
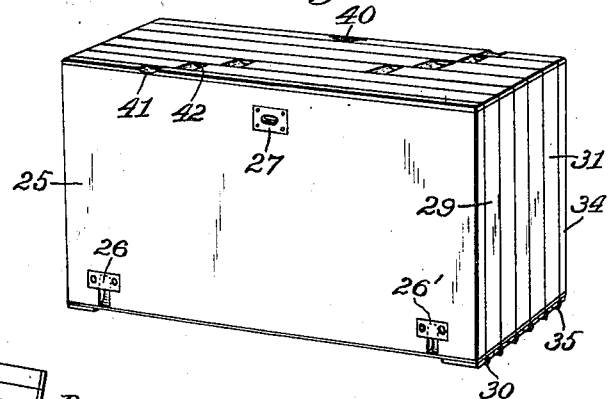
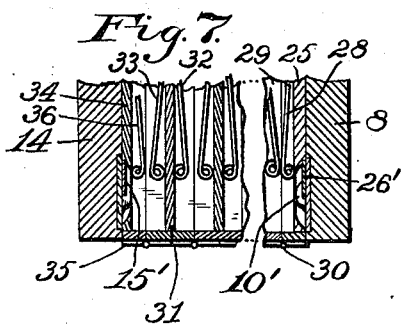
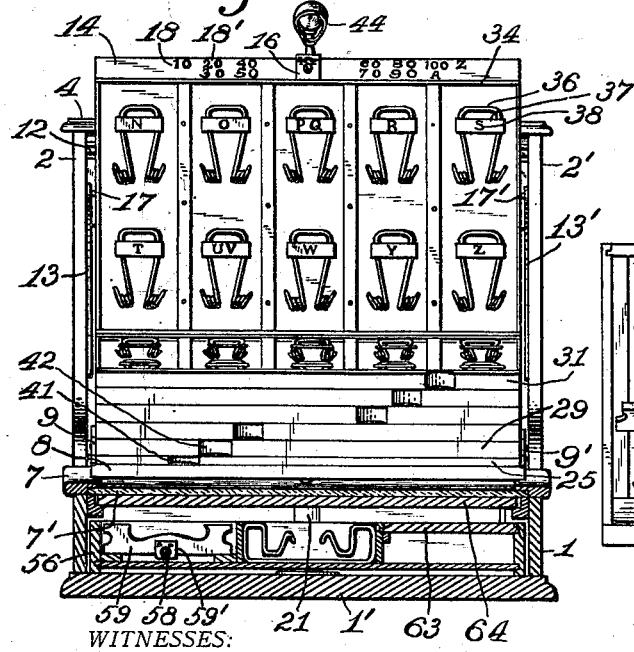
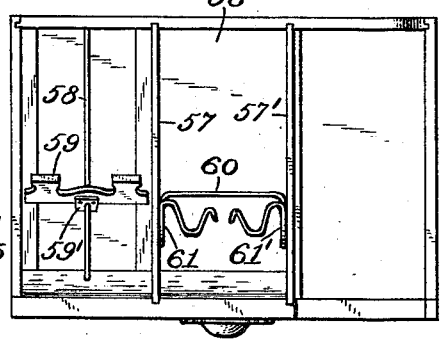
WITNESSES:
J. H. Gardner.
M. D. Beaty.
INVENTOR:
Perry A. McCaskey,
BY
E. T. Silvius,
ATTORNEY.

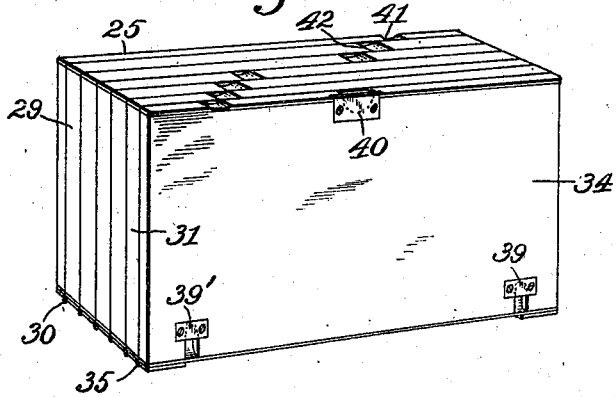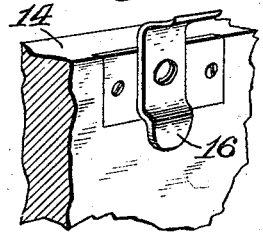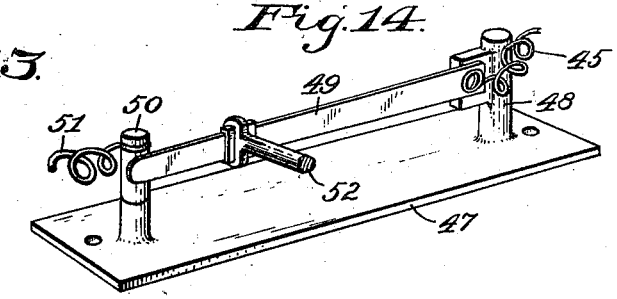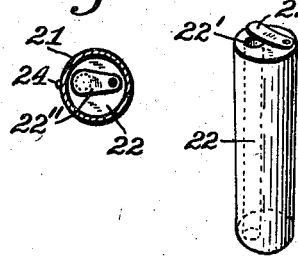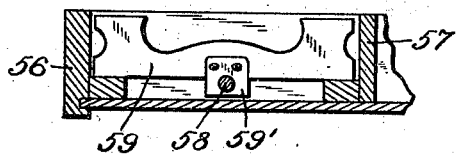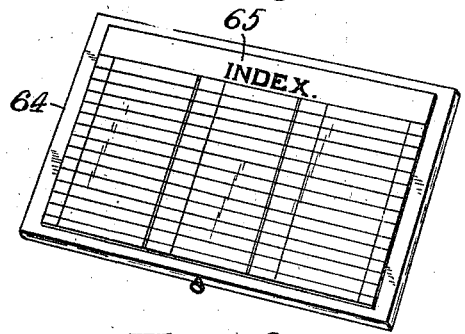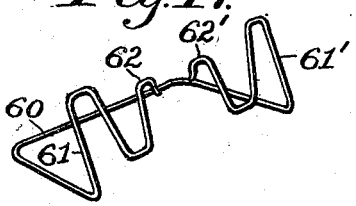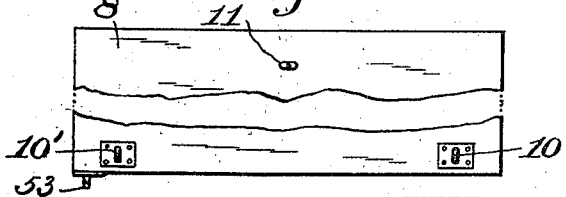

UNITED STATES PATENT OFFICE.

PERRY A. McCASKEY, OF ALLIANCE, OHIO, ASSIGNOR TO THE McCASKEY REGISTER COMPANY, OF ALLIANCE, OHIO, A CORPORATION OF OHIO.

FILING APPLIANCE.

977,960.  Specification of Letters Patent.  Patented Dec. 6, 1910.

Application filed October 3, 1907. Serial No. 395,753.

*To all whom it may concern:*

Be it known that I, PERRY A. McCASKEY, a citizen of the United States, residing at Alliance, in the county of Stark and State of Ohio, have invented certain new and useful Improvements in Filing Appliances; and I do declare the following to be a full, clear, and exact description of the invention, reference being had to the accompanying drawings, and to the letters and figures of reference marked thereon, which form a part of this specification.

This invention relates to registers or cabinets in which duplicate sales bills are filed in systematic order by merchants for keeping credit accounts, the invention having reference particularly to bill holding leaves and the means whereby they are mounted in the cabinets or cases of the registers, the invention having reference also to various other features of construction of the registers.

Objects of the invention are to provide improved groups of bill holding leaves adapted especially to be folded into compact form for storage in fire-proof safes or vaults when not in use, and to provide improved means for mounting the leaves so as to be easily manipulated, further objects being to improve the cases for the leaves.

The invention consists in a credit account register comprising a case provided with adjustable devices for holding a set of bill holding leaves that are hinged together, and means for connecting the foremost and rearmost leaves to the holding devices, the invention consisting further in improved means for moving the rearmost leaves forward when the foremost leaves are moved forward. And the invention consists further in the novel parts and combinations and arrangements of parts as hereinafter particularly described and defined in the appended claims.

Figure 1:
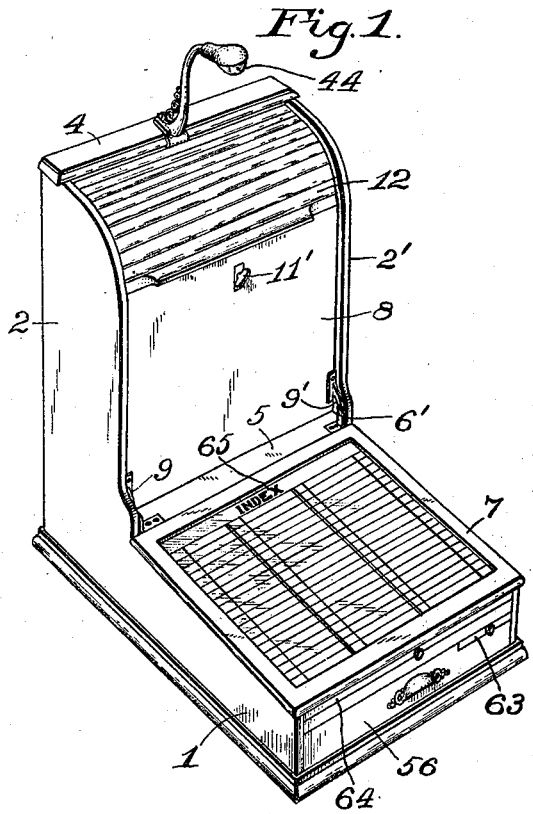
Figure 2:
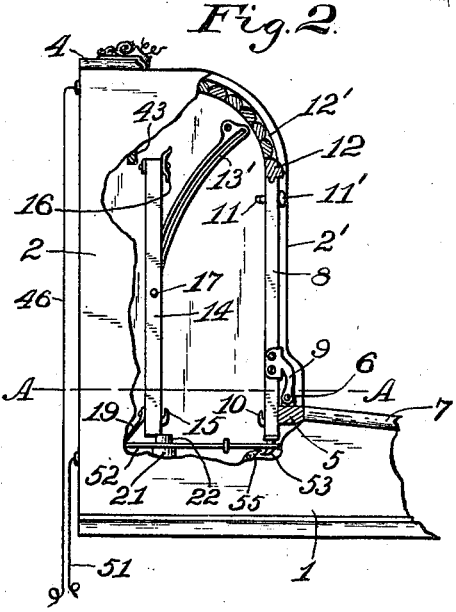
Figure 3:
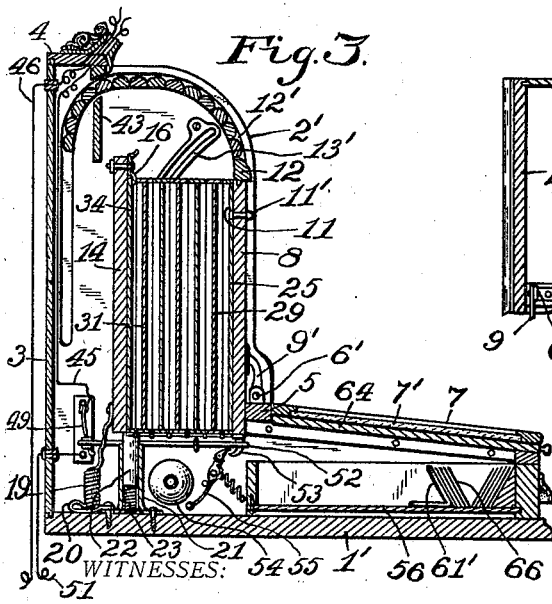
Figure 4:
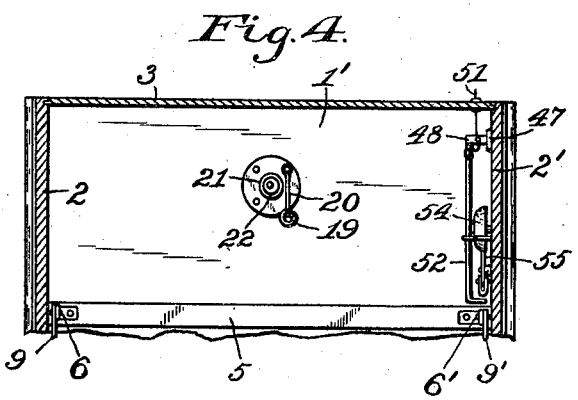

Referring to the drawings Figure 1 is a perspective view of the improved register closed so that the accounts therein may not be seen; Fig. 2, a fragmentary side elevation partially broken away to expose interior parts thereof; Fig. 3, a central vertical sectional view of the register; Fig. 4, a fragmentary horizontal sectional view of the register without the bill holding leaves approximately on the line A A in Fig. 2; Fig. 5, a side elevation of the register partially broken away to show internal parts thereof; Fig. 6, a front perspective view of the improved bill holding leaves detached from the case; Fig. 7, a fragmentary sectional view of the group of leaves; Fig. 8, a front elevation of Fig. 5 with a portion in vertical section on the line B B; Fig. 9, a top plan of the drawer for holding overflow accounts and supplies; Fig. 10, a rear perspective view of the group of bill holding leaves; Fig. 11, a fragmentary perspective view of the follower comprising a part of the holding devices for the leaves; Fig. 12, and Fig. 13, detail views of the cushion for the bill holding leaves; Fig. 14, a perspective view of the circuit breaker for the electric light of the register; Fig. 15, a perspective view of the index table; Fig. 16, a fragmentary sectional view of the drawer of the register; Fig. 17, a perspective view of an improved adjustable card holder for the register drawer; and, Fig. 18, a fragmentary rear elevation of the leaf carrier.

Similar reference characters in the various figures of the drawings designate similar elements or features of construction.

A practical embodiment of the improved register comprises a case having a desk-like part 1, having a bottom 1', and an upright part comprising two sides 2 and 2' and a back 3 upon which is a top 4. A cross bar 5 is suitably secured in the front portion of the case approximately at the junction of the sides 2 and 2' with the top of the desk-like part, and a pair of pivots 6 and 6' are mounted on the cross bar. A frame 7 is secured on the top of the desk-like part and has a glass panel 7' forming a cover for the desk-like part. A carrier 8 is provided with a pair of arms 9 and 9' which are connected to the pivots 6 and 6' respectively, the carrier being in the form of a rectangular plate and normally extending vertically down at the rear of and against the cross bar 5, but adapted to swing forward and down onto the top of the frame 7 for supporting and carrying the group of leaves, the lower rear portion of the carrier being provided with a pair of hooks 10 and 10', the upper portion of the carrier being provided with a button 11 having a handle 11'. A roll top 12 is mounted movably in the upper portion of the case in suitable grooves 12' in the sides of the case, the roll top being adapted to close against the top of the carrier 8, the latter when upright forming a front closure in connection with the roll top.

The sides 2 and 2' are provided on the interior thereof with a pair of slotted guides 13 and 13' which curve upwardly and forwardly from the middle portions of the sides. A leaf follower 14, comprising a part of the carrying devices for the leaves, is somewhat like the carrier 8 in form but is somewhat taller and is provided at the forward lower portions thereof with a pair of hooks 15 and 15' and at the top with a button 16, the two opposite sides of the follower being provided with a pair of guide-pins 17 and 17' which enter the slots of the guides 13 and 13' for guiding the upper portion of the follower. By this construction, the rear leaf of the series of leaves is guided during its up and down movements. When all of the leaves forward of the rear leaf are reclined, as shown in Fig. 5, the pins 17, 17' engage the end walls of the slots 13, 13' and thus prevent the reclining of that leaf. On the forward side of the upper portion of the follower are suitable index characters 18, such as the numeral "10," and 18', at which numerals "20" and "30" are shown, and other indexing arranged at different places as guides for selecting the various leaves when access thereto is desired. When the leaves are out of the case the follower 14 normally stands upright somewhat distant from the rear of the carrier 8, and it is provided with a spring 19 that is connected by a flexible cord 20 which is secured to the bottom 1'. A cushion for the follower and the leaves comprises a hollow cylinder 21 that is mounted on the bottom 1' and has a plunger 22 fitting closely and movable vertically in the cylinder, there being preferably a spring 23 in the cylinder under the plunger, but in some cases the spring may be omitted. The plunger has an opening 22' extending therethrough, and the lower end thereof is provided with a flat valve 22'' as will be seen clearly in the inverted views of the plunger in Figs. 12 and 13, so that when the plunger is pushed upward by the spring 23, the valve will open, and when pushed down suddenly the valve will close, but air will be permitted to pass from the bottom of the cylinder around the plunger to a limited extent while the plunger descends. It will be obvious however, that various forms of pneumatic cushions or spring cushions may be employed. The upper end of the plunger 22 is provided with a stop pin 24 to engage the top of the cylinder 21 when the plunger is depressed.

The bill holding leaves or frames are arranged in a group which normally is rectangular so as to occupy the minimum amount of space. A lower front portion of the foremost leaf 25 has a pair of catch plates 26 and 26' adapted to be engaged by the hooks 10 and 10', and also is provided at the upper portion thereof with a catch plate 27 adapted to be engaged by the button 11, so that the leaf may be secured to the carrier 8 detachably. The foremost leaf has a suitable number of clamps 28 arranged on the inner side thereof for holding bill slips. Another bill holding leaf 29 is connected by hinges 30 to the leaf 25 and has another similar leaf hinged thereto, there being as many double leaves as may be desired hinged one to another in like manner, the rearmost double leaf 31 having also bill clamps 32 and 33 on both front and rear thereof, and the rearmost leaf 34 is connected to the leaf 31 by hinges 35, and is provided on the forward side thereof with bill clamps 36 having plates 37 thereon which have index characters 38, all of the clamps on the various leaves being indexed in a similar manner. By connecting the leaves together at their lower ends, it will be understood that, when one or more of them are reclined, the lower edges of all the remaining leaves are moved forwardly. The lower rear parts of the rearmost leaf 34 are provided with catch plates 39 and 39' adapted to be engaged by the hooks 15 and 15' of the follower, and the upper portion is provided with a catch plate 40 adapted to be engaged by the button 16, so that the rearmost leaf may be secured detachably to the follower. When the leaves are upright the rearmost leaf preferably engages the top of the plunger 22. The top of the foremost leaf 25 has a recess 41 forward of the index characters 18, so that it will indicate which leaf is to be drawn forward to find an account filed under such index characters, and the next leaf 29 has a recess 42 forward of the index characters 18' to facilitate the finding of the indexed accounts. Normally the follower 14 extends somewhat higher than the rearmost leaf 34, and a facing board 43 extends across the case between the sides 2 and 2' slightly at the rear of the top of the follower.

An electric lamp 44 is mounted upon the top 4 of the case, so as to reflect light down upon the bill holding leaves and desk-like part of the case, the lamp having circuit wires 45 and 46 provided with a circuit breaker comprising a base 47 on which is a pillar 48 supporting an elastic bar 49 which normally makes contact with a post 50 to which a circuit wire 51 is connected, there being a rod 52 connected to the bar 49 to be engaged by a finger 53 that is attached to the lower portion of the carrier 8, so that when the carrier is upright in normal position the contact will be broken between the bar 49 and the post 50, the rod 52 being released when the carrier and the leaves are moved forward, so as to permit of closing the circuit to obtain advantage of the electric light. The wires 46 and 51 are to be connected to a suitable source of electric energy. A gong 54 is suitably mounted in the case and is provided with a trip hammer 55 which may be tripped to strike the gong by the finger 53 when the carrier 8 begins to move forward on its pivots.

The forward or desk-like part of the case has a drawer 56 therein in which are suitable partitions 57 and 57', and suitable followers are provided in the spaces in the drawer for holding index cards close together or with bill slips between them which may be removed from the bill holding leaves when any of the accounts become too large to be held by the bill clamps. Two forms of followers are illustrated, in one of which a rod 58 is arranged near the bottom of the drawer. A follower 59 is suitably guided and has a clutch plate 59' attached thereto, so as to embrace and clutch the rod when adjusted, the follower moving freely on suitable guides when vertical and being fixed when in an inclined position. In another type, the follower comprises a bar 60 formed of wire and having members 61 and 61' adapted to frictionally engage the partitions, the members having terminals 62 and 62' for handling the follower, and by drawing the terminals together the members 61 and 61' may be drawn away from their contact with the partitions, so that the follower may be readily readjusted. A sliding leaf 63 is mounted upon the top of the drawer 56 and may be drawn forward independently or with the drawer, and may be used for various purposes, particularly as a holder for a delinquent sheet or other memoranda. An index sheet holder 64 is formed as a rectangular plate and is mounted slidingly under the glass plate 7', there being a suitable index sheet 65 placed on the top of the holder.

In practical use, the group of bill holding leaves will normally stand upright as in Fig. 3, and when one or more of the leaves are carried forward on the carrier 8, as in Fig. 5, the rearmost leaf 34 will elevate the follower 14 until the spring 19 is under tension, the spring having a tendency to draw the follower downward and therefore assist in elevating the leaves which may be drawn forward to reclining positions, or causing a tilting movement on the pivots 6 and 6'. By reason of the flexible cord 20 the spring is not brought under tension when the leaves are back nearly to their normal positions, but the spring 23 not only assists in starting to move the leaves forward, but serves as a cushion when the group is thrown back to their upright positions.

The operations of the electric light and the gong mechanism will be fully understood from the description of their construction. It will be understood that suitable index cards 66 are arranged in the drawer 56, and the bill slips which cannot be held by the leaves may be placed between the index cards and may readily be removed to places of safety at the close of business hours, at which times the group of bill holding leaves may be quickly detached from the carrier 8 and the follower 14 and removed to a suitable place for safety against fire.

Having thus described the invention, what is claimed as new is—

1. In a filing appliance, the combination with the casing, of a carrier, means for pivotally supporting the carrier in the casing, a plurality of removable bill holding leaves, means mounted on the carrier for pivotally supporting the said bill holding leaves relatively to each other, and means engaging with the top of the said carrier for inclosing the bill holding leaves in the casing.

2. In a filing appliance, the combination of a pivotally mounted carrier, a plurality of bill holding leaves adapted to swing from a substantially vertical to a substantially horizontal position, and means for pivotally and detachably mounting the said leaves on the carrier.

3. In a filing appliance, the combination of a pivotally mounted carrier, a plurality of bill holding leaves hinged together and adapted to swing from a substantially vertical position to a substantially horizontal position, and means for detachably mounting the said leaves on the carrier.

4. A filing appliance including a pair of stationary pivots, a carrier mounted on the pivots and extending below the plane of the pivots when in upright position, and a group of bill-holding leaves connected pivotally together and means for removably securing the foremost leaf to the carrier and thereby supporting the remaining leaves.

5. A filing appliance including a case, a carrier pivoted in the case to normally stand upright and extend below the plane of the pivots, a cushion in the case, a plurality of bill-holding leaves hinged together, and means for removably securing the foremost leaf to the carrier, the rearmost leaf normally resting on the cushion and movable therefrom when the carrier moves on its pivots.

6. A filing appliance including a case, a plurality of bill-holding leaves hinged together and pivotally supported normally in upright position, each leaf having a recess in the top thereof, and means behind the rearmost leaf and movable therewith having index characters thereon rearward and above the planes of the recesses in the leaves.

7. A filing appliance including a case, a carrier pivoted in the case to normally stand upright, a plurality of bill-holding leaves hinged together and the foremost leaf secured to the carrier, and a top mounted in the case and movable into contact with or away from the top of the carrier.

8. A filing appliance including a case, a carrier pivoted in the case to normally stand upright, a cushion mounted in the case, a plurality of bill-holding leaves connected together pivotally, the foremost leaf being removably secured to the carrier, a follower removably secured to the rearmost leaf and normally supported by the cushion, and a spring connected to the case and to the follower and strained only when the follower is removed from the cushion.

9. A filing appliance including a plurality of bill-holding leaves hinged one to another, the foremost and rearmost leaves having each a plurality of fastening devices for the support and guidance thereof, a pivoted carrier having fastening devices to engage the fastening devices of the foremost leaf, and a guided follower having fastening devices to engage the fastening devices of the rearmost leaf.

10. A filing appliance including a case, a carrier pivoted in the case, a plurality of bill-holding leaves hinged together, the foremost leaf being secured to the carrier, each leaf having a recess in the top thereof, a follower secured to the rearmost leaf and extending beyond the top thereof, the front of the upper portion of the follower having index characters thereon rearward of the recesses in the leaves, and a guide for the follower.

11. A filing appliance including a case comprising two opposing sides having each a guide mounted on the inner side thereof, a carrier pivoted in the case, a plurality of bill-holding leaves hinged together, the foremost leaf being secured to the carrier, and a follower secured to the rearmost leaf and having devices attached thereto and engaging the guides.

12. A filing appliance including a case, a carrier pivoted in the case, a plurality of bill-holding leaves hinged together and provided with indicating devices, the foremost leaf being secured to the carrier, a follower secured to the rearmost leaf and extending beyond the top thereof, the front of the upper portion of the follower having index characters thereon, and a guide for the follower.

13. In a filing appliance, the combination of a casing, a series of pivotally mounted leaves, a device for supporting the leaves pivotally mounted in the casing, and a top movable into and out of engagement with the said pivotal supporting device when the latter is in normal position.

14. In a filing appliance, the combination of a casing, a series of leaves, means for supporting the leaves in the casing and permitting pivotal movement thereof relative to each other, a guide, and means interposed between the rearmost leaf and the said guide for maintaining the rearmost leaf in upright position when all of the leaves forward of said rear leaf are reclined.

15. In a filing appliance, the combination of a casing, a series of leaves, means for supporting the leaves in the casing, connections between the lower ends of the leaves permitting pivotal movements of the leaves relative to each other and operating, when one or more of the leaves are reclined, to move the lower edges of the remaining upright leaves forwardly, a stationary guide, and means interposed between the rear leaf of the series and the said guide, and having sliding engagement therewith, for maintaining the rear leaf upright when all the leaves forward of the said rear leaf are reclined.

16. In a filing appliance, the combination of a casing, a guide device mounted therein, a series of leaves having connections between their lower ends permitting the swinging of the leaves relative to each other and operating to move the lower edges of the leaves forwardly as one or more of them are reclined, and means interposed between the rear leaf of the series and said guide device for guiding the up and down movements of the said rear leaf and for maintaining it upright when all of the leaves forward thereof are reclined.

17. In a filing appliance, the combination of a casing, a series of leaves pivotally mounted therein, connections between the lower ends of the leaves permitting pivotal movements thereof relative to each other and operating, when one or more of the leaves are reclined, to move the lower edges of the remaining leaves forwardly, and means interposed between the rear leaf of the series and the casing for guiding the up and down movements of the rear leaf and maintaining it upright when all the leaves forward of said leaf are reclined.

18. In a filing appliance, the combination of a casing, a series of leaves pivotally mounted therein and including a follower, means or connections between the leaves permitting pivotal movements thereof relative to each other and operating, when one or more of the leaves are reclined, to move the lower edges of the remaining leaves forwardly, and means interposed between the follower and the casing for guiding the up and down movements of the rear leaf and maintaining it upright when all the leaves forward of said leaf are reclined.

19. In a filing appliance, the combination of a series of leaves, connections between the leaves operating, when one or more of them are operated, to move the lower edges of the remaining leaves forwardly, and a device carrying index characters movable with the rearmost leaf of the series, the upper edges of the leaves being formed with cut-away portions arranged at different distances from the ends of the leaves and coöperating with the index characters on said device.

20. In a filing appliance, the combination of a casing, a pair of spaced members movably mounted in the casing, and a series of leaves supported by the said members including means to permit the reclining of said leaves relative to each other.

21. In a filing appliance, the combination of a casing, a pair of spaced members, means for pivotally supporting one of said members in the casing, means for slidably supporting the other of said members in the casing, a series of leaves supported by said members, and means permitting the reclining of the leaves relatively to each other.

22. In a filing appliance, the combination of a casing, a pair of spaced members movably mounted in the casing, a series of leaves supported by the said members including means to permit the reclining of said leaves relatively to each other, and a top movable into engagement with one of said members when in normal position for inclosing the said leaves.

23. In a filing appliance, the combination of a casing, a carrier, a series of leaves having connections between them and permitting them to recline relative to each other, the frontmost leaf of the series being connected to said carrier, means for pivotally supporting the said carrier in the casing, the axis of the said pivotal supporting means for the carrier being arranged intermediate the upper and lower edges thereof, and means coöperating with said carrier for supporting the leaves in the casing when the leaves are in upright position.

24. In a filing appliance, the combination of a casing, a series of leaves normally arranged in upright position, means for supporting the leaves in normal position pivotally mounted in the casing, means permitting the leaves to swing from the normal position to a substantially horizontal position, and a top movable into and out of engagement with the said pivotal supporting means when in normal position.

25. In a filing appliance, the combination of a casing having a side wall, a series of leaves having connections between them permitting the leaves to swing from a substantially vertical position to a substantially horizontal position, and vice versa, a bar provided with a guide surface or wall carried by the side wall of the casing, and a device operatively connected with the rear leaf of the series of leaves slidably engaging with said guide surface or wall for guiding the up and down movements of said rear leaf and maintaining it upright when all the leaves forward thereof are swung into a horizontal position.

26. In a filing appliance, the combination of a casing having side walls, a series of leaves having connections between them permitting them to swing relatively to each other, the frontmost leaf of the series being pivotally supported in the casing, a follower to which the rearmost leaf of the series is secured, and coöperating devices between the opposite sides of the follower and the adjacent side walls for guiding the rearmost leaf in its up and down movements and maintaining it upright when all the leaves forward thereof are operated.

27. The combination of a casing, a series of leaves mounted in the casing, connections between the leaves permitting them to swing from a substantially vertical to a substantially horizontal position, and vice versa, and two coöperating elements, one carried by the casing and the other operatively connected with the rearmost leaf of the series of leaves for guiding the said rearmost leaf in its up and down movements and maintaining it upright when all the leaves forward thereof are swung into the horizontal position.

28. A filing appliance, including a case, a plurality of bill-holding leaves geared or connected together and pivotally supported in the case, each of said leaves having a recess in the top thereof, and a follower secured to said rearmost leaf and extending beyond the top thereof, the front of the extended portion of the follower having index characters thereon rearward of the recesses in the leaves.

In testimony whereof, I affix my signature in presence of two witnesses, on the 27th day of September, 1907.

PERRY A. McCASKEY.

Witnesses:
J. J. BROWN,
MARY M. AULD.